INVENTORS
J.S. CONNORS
O.R. CURRIE

BY Young and Quigg

ATTORNEYS

INVENTORS
J.S. CONNORS
O.R. CURRIE
BY *Young & Quigg*
ATTORNEYS

United States Patent Office 3,257,773
Patented June 28, 1966

3,257,773
DEHYDRATION OF GAS FOR RECOVERY OF HELIUM THEREFROM
James S. Connors and Orin R. Currie, Bartlesville, Okla., assignors to Phillips Petroleum Company, a corporation of Delaware
Filed Apr. 29, 1963, Ser. No. 276,233
7 Claims. (Cl. 55—31)

This invention relates to the dehydration of a gaseous stream. In one aspect this invention relates to the dehydration of a natural gas stream for the recovery of helium therefrom. In still another aspect this invention relates to a process for the substantially complete removal of moisture from a gas.

Helium is manufactured by recovering helium, often in very small concentrations, from natural gas. The process often used in recovering helium from a natural gas is simply one of low temperature liquefaction. In the helium extraction process it is necessary to cool the gas to very low temperatures, approximately $-295°$ F. Since hydrates will form at approximately $45°$ F., it is necessary to dry the gas substantially completely before it enters the helium recovery steps in order to prevent ice from plugging passageways such as in heat exchangers and other equipment.

In a typical helium recovery plant the gas introduced to the dehydrators at, for example, $87°$ F. and 368 p.s.i. will contain as much as 92 pounds of water vapor per million cubic feet of gas. With a helium plant of 220,000,000 cubic feet of gas per day this means the inlet stream contains 20,200 pounds of water per day. The substantially complete removal of this water is necessary for the satisfactory operation of the helium plant and the substantially complete removal of such quantities of water has presented the industry with a number of problems including the provision of a flow of a large volume of substantially bone-dry gas and the provision of an adequate quantity of heat at the required locus for regeneration of the desiccant employed.

Figure 1:
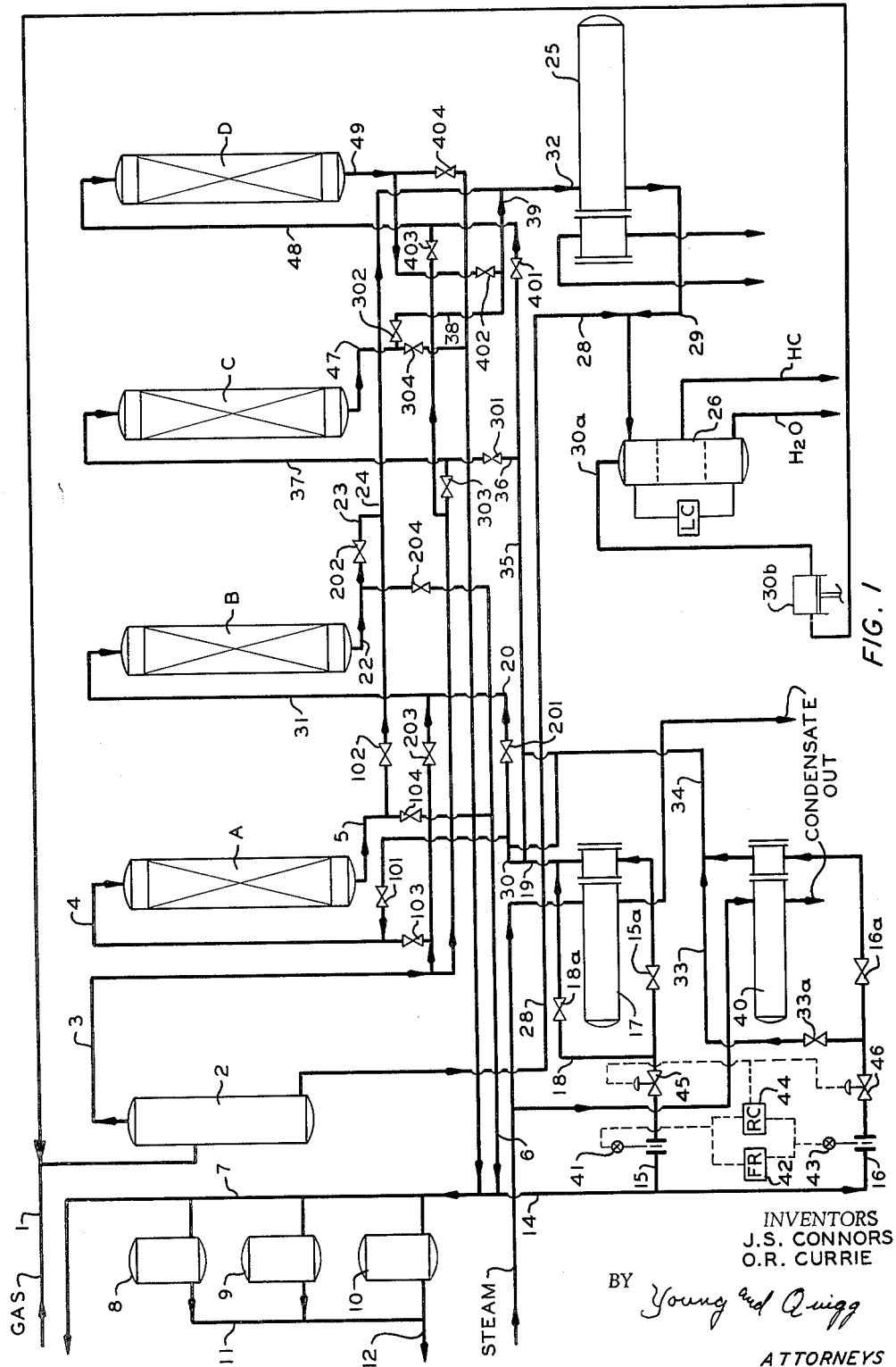
Figure 2:
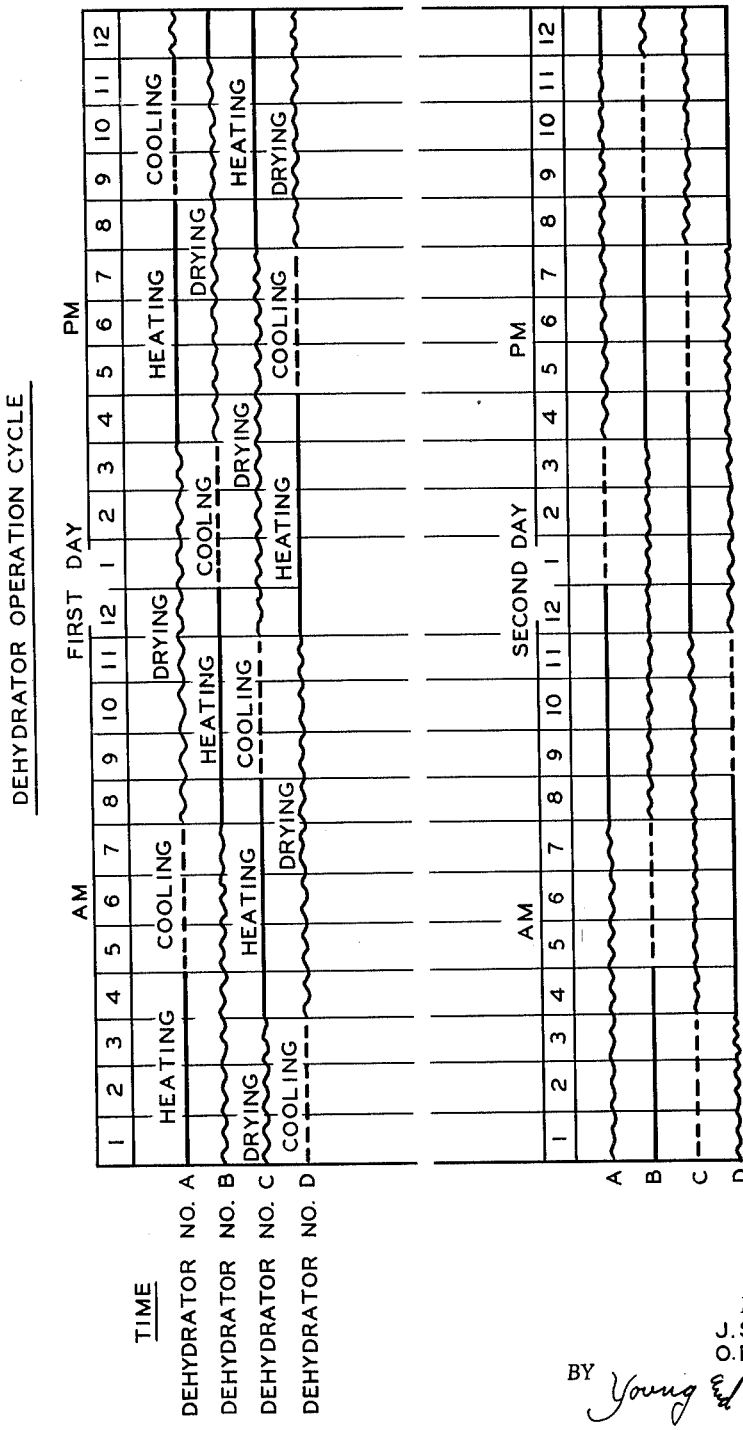

It is a principal object of this invention to provide a method and means for the substantially complete removal of water vapor from a natural gas stream being processed for the removal of helium therefrom. Another object of the invention is to provide a method of operation to supply a stream of natural gas to a helium recovery unit having a relatively constant and extremely low concentration of water vapor therein. Another object of this invention is to provide a method for the regeneration of dehydration equipment so that smaller than normal conduits can be employed for supplying the heating medium to the dehydration equipment. Other and further objects and advantages of this invention will be apparent to one skilled in the art upon studying the disclosure of this invention including the detail description of this invention and the appended drawing wherein:

FIGURE 1 is a schematic flow diagram of the dehydration system of the invention; and
FIGURE 2 is a graphic illustration of the heating and drying cycles of the various units of the dehydration system.

An understanding of the invention will be facilitated by referring to the attached drawing wherein the helium plant feed must be dried down to a water content of less than 0.1 pound per million cubic feet of gas or a water dew point of $-100°$ F. The gas to be dehydrated passes through conduit 1 to a scrubber 2 wherein the gas is separated from liquid and flows through conduit 3, valve 103 and conduit 4 to dehydrator A. The effluent from dehydrator A passes through conduit 5, valve 104, conduit 6, conduit 7 and one of filters 8, 9 or 10 to header 11 and thence via conduit 12 to the helium extraction plant. When the gas first begins to go through dehydrator A, dehydrator B is being regenerated, dehydrator C is substantially regenerated and dehydrator D has been dehydrating gas for 4 hours. The dehydrators operate cyclically, dehydrating gas for 8 hours, being heated for 5 hours, and then being cooled for 3 hours. For convenience of description each phase of this cyclic operation will be referred to as a cycle, i.e., dehydrating cycle, heating cycle and cooling cycle.

A portion of the gas from conduit 6 flows through conduit 14. One half of the gas flowing through conduit 14 passes through conduit 15, valve 15a, heat exchanger or heater 17, conduits 19, 30, valve 201, conduits 20, 31, and then through dehydrator B. The hot gas flowing through dehydrator B dehydrates the desiccant contained in the dehydrator and passes via conduit 22, valve 202, conduits 23, 24 and 32, into heat exchanger 25 which acts as a cooler. The effluent from cooler 25 passes through conduit 29 and into separator 26 wherein the water, along with some hydrocarbons, condenses so that three phases are formed in separator 26, i.e., liquid water, liquid hydrocarbon and gaseous hydrocarbon. Liquid also passes from scrubber 2, via conduits 28 and 29 to separator 26. Water is withdrawn from the bottom of separator 26 and used for boiler feed water. Condensed hydrocarbons are removed from separator 26 for further processing. The effluent gas from separator 26 passes through conduit 30a and is compressed at 30b and added to the gas in conduit 1.

The other half of the gas passing through conduit 14 passes through conduits 16, valves 46 and 33a, conduits 33, 34, 35, 36, valve 301 and conduit 37 into dehydrator C to cool the desiccant which had been regenerated by hot gas. The effluent from dehydrator C passes through line 47, valve 302, conduit 38, conduit 39 and conduit 32 to cooler 25. The cooled gas passing from conduit 39 into conduit 32 mixes with the hot gas in conduit 32 passing via conduit 24 from dehydrator B.

Upon termination of the dehydrating cycle of dehydrator D, gas passes via conduits 14, 16, valve 16a, heater 40, conduits 34, 35, valve 401 and conduit 48 to dehydrator D. Effluent from dehydrator D passes through conduit 49, valve 402, conduit 39 and conduit 32 to cooler 25. Heat exchanger 17 supplies hot regeneration gas to dehydrators A and B and heat exchanger 40 supplies hot regeneration gas to dehydrators C and D. Gas for cooling the regenerated dehydrators A and B is by-passed around through valve 18a heat exchanger 17 and gas for cooling regenerated dehydrators C and D is by-passed around heat exchanger 40.

Gas passes through conduit 14 and thence through conduits 15 and 16 in a predetermined ratio. The gas stream passing through conduit 14 is generally divided equally between conduits 15 and 16. The gas passing through conduit 15 passes either through heat exchanger 17 or by-pass conduit 18. The gas flow through conduit 16 is passed either through heat exchanger 40 or heat exchanger by-pass conduit 33. Flow transmitter 41 in conduit 15 transmits a signal to flow recorder 42 and ratio controller 44. Flow transmitter 43 in conduit 16 transmits a signal to ratio controller 44 and flow controller 42. Controller 44 transmits a signal to motor valves 45 and 46 that increases as the ratio of the signal from transmitter 41 to the signal from transmitter 43 increases.

In a preferred method of operation, motor valve 45 in conduit 15 is wide open when controller 44 transmits a signal of 3 to 9 p.s.i. and gradually closes when the signal it receives increases from 9 to 15 p.s.i. Motor valve 46 in conduit 16 is wide open when it receives a signal from 9 to 15 p.s.i. and gradually closes when the signal decreases from 9 to 3 p.s.i. When both valves 45 and 46 receive a signal of 9 p.s.i., both valves are wide open.

If the signal transmitted by controller 44 is increasing in the range from 9 to 15 p.s.i., motor valve 45 will be closing and motor valve 46 will be wide open. As controller 44 transmits a signal that is decreasing from 9 to 3 p.s.i., valve 45 will be wide open and valve 46 will be closing. The above ratio control system provides means to maintain a predetermined ratio of streams in conduits 15 and 16 with a minimum of back pressure imposed on the streams as resistance downstream from the control apparatus varies on the individual streams.

FIGURE 2 shows graphically the heating, cooling and drying cycles of each of dehydrators A, B, C and D and the relationship of each of these dehydrators to the other dehydrators during each hour for a 48-hour period. The invention as applied to operating the system cyclically may be more easily understood by describing the steps in the sequence of cycle changes starting with 8 a.m. on the first day's operation, according to FIGURE 2, as considered with the physical equipment illustrated in FIGURE 1. Dehydrator A is changed from the cooling cycle to the drying cycle by placing the ratio controller 44 on manual control; closing the regeneration gas inlet valve 101; closing the regeneration gas outlet valve 102; opening the feed flow inlet valve 103; waiting for the dehydrator A to build up pressure to operating pressure; and then opening the product flow outlet valve 104.

Dehydrator B is changed from drying to heating by closing the feed flow inlet valve 203; closing the product flow outlet valve 204; opening the regeneration gas outlet valve 202; waiting for the dehydrator vessel to depressurize to regeneration pressure; opening the regeneration gas inlet valve 201; opening the block valve 15a to the heat exchanger 17; closing the by-pass valve 18a around the heat exchanger 17; and placing the ratio controller 44 back on automatic operation.

Product flow outlet valves 304 and 404 perform the same service for dehydrators C and D in their identical cycles as valves 104 and 204 perform for dehydrators A and B respectively. Similarly, inlet valves 303 and 403 perform the same service for C and D as valves 103 and 203 do for A and B respectively.

At 9 a.m. heating of the desiccant in dehydrator C is discontinued and cooling of the desiccant is begun by opening by-pass valve 33a and closing valve 16a in conduit 16 so as to by-pass the gas around heat exchanger 40.

The switching sequence is critical because the regeneration pressure will be 10 to 20 p.s.i. below the dehydrating pressure. Improper switching will cause movement of the desiccant bed resulting in breakage of desiccant and formation of fines.

The desiccant will preferably be a layer of activated alumina and a layer of a molecular sieve comprising metal alumina silica.

It is a feature of the invention that two heaters, e.g., 17 and 40 each of which has sufficient capacity to regenerate one dehydrator, are employed instead of one heater having sufficient capacity to regenerate two dehydrators. By using two heaters, each operating on stream 5 hours and offstream 3 hours, there is a 1-hour period every 4 hours when both heaters are on stream simultaneously. If only one heater were employed, the hot gas conduits connecting the heater to the dehydrators would need to have a capacity sufficient to supply hot gas to two dehydrators simultaneously one hour out of each four. By using two heaters the piping is simplified and the pipe size required is reduced substantially.

It is also a feature of the invention that the dehydrators are staggered in their cyclic operation so that two dehydrators are always on stream one of which is put on stream in the drying cycle when the other dehydrator is half way through the drying cycle. By operating in this manner one of the dehydrators is relatively fresh whereas the other dehydrator is completing its drying cycle. This provides a lower maximum water content of the dried gas than is obtained by prior art methods.

A further feature of the invention which is made possible by the cyclic operation of the dehydrators according to the process of this invention is that the effluent gases from the dehydrator which is being cooled and the dehydrator which is being regenerated are combined before passing to the cooler 25 so that a substantial reduction in size or capacity of the cooler 25 is obtained because the maximum temperature of the gas stream passing to the cooler is, for example, about 250–275° F. instead of about 350° F.

A still further feature of the invention is that operation according to the process of the invention makes possible the use of one liquid water-liquid hydrocarbon-gaseous hydrocarbon separator 26 for separating the liquid from scrubber 2 and the liquid from heat exchanger 25.

In the specific embodiment of the invention illustrated and described the solid desiccant material in the dehydrators or driers is regenerated with gas which has been dried in the dehydrators and heated with steam in indirect heat exchangers. A 5-hour heating cycle is employed so that lower pressure steam can be utilized for heating. A 3-hour period is ample for cooling the desiccant. A 4-hour heating cycle can be employed, if desired, by using higher pressure steam or by using a direct fired heater or furnace to heat the gas stream to a higher temperature.

That which is claimed is:

1. In the method of dehydrating a water-containing gas by passing a stream of said gas cyclically through a desiccant-containing zone followed by regenerating and cooling the desiccant in said zone, the improvement comprising dividing said stream of gas into separate portions; starting one of said portions through one and only one of a plurality of desiccant-containing zones in parallel with a second desiccant-containing zone when said second zone is about one half through its dehydrating cycle of another of said portions, said second zone being the only zone to receive said another of said portions; and combining the effluent gas from both desiccant-containing zones as the dry product so that the product gas is derived from a desiccant-containing zone in the first half of its cycle and a desiccant-containing zone in the last half of its cycle.

2. The method of dehydrating a water-containing gas to a water content of not more than about 0.1 pound of water per million cubic feet of gas which comprises dividing said gas into a plurality of separate streams of gas; passing a first stream of said gas to a first and sole desiccant-containing zone for a period of time; passing a second stream of said gas to a second and sole desiccant-containing zone at the termination of about one half of said period of time; combining said dried first and second streams; terminating flow of said first stream of gas to said first zone at the termination of said period of time; heating said first zone to regenerate said desiccant; passing a third stream of said gas to a third desiccant-containing zone at the termination of said period; continuing to pass streams of said gas cyclically and in parallel to a plurality of desiccant-containing zones so that a stream of gas is started to one zone when another zone is about one half through the dehydrating cycle; and heating said zones to regenerate the desiccant after each dehydrating cycle.

3. The method of claim 2 wherein during a major portion of the time at least two zones are dehydrating streams of said gas; at least one zone is being heated; and at least one zone is being cooled.

4. The method of claim 3 wherein the effluent streams from a zone being heated and from a zone being cooled are combined a major portion of the time so as to reduce the temperature of the resulting stream.

5. The method of operating a plurality of driers cyclically and in parallel wherein each cycle endures for a predetermined time period which comprises dividing a feed into a plurality of separate streams; passing a first of said streams to a first and sole drier for a first cycle;

passing a second of said streams in parallel to said first stream to a second and sole drier for a second cycle when the first drier has been on drying cycle for about one half said first cycle; combining said dried first and second streams; passing a third of said streams in parallel to said first and second streams to a third drier for a third cycle when the first drier has been drying for the duration of said first cycle; passing a fourth of said streams in parallel to said first, said second, and said third streams to a fourth drier for a fourth cycle when the second drier has been drying for the duration of said second cycle; heating said first drier at the termination of said first cycle for a time sufficient to regenerate said first drier; cooling said first drier for the remainder of said third cycle; and heating, to regenerate, and cooling said second, said third and said fourth driers following each drying cycle as described with respect to said first drier.

6. Apparatus for dehydrating a water-containing gas comprising a plurality of desiccant-containing chambers; means to pass a stream of water-containing gas from a feed stream source to each of said chambers in parallel; means to recover dehydrated gas from each of said chambers; means to pass a portion of said stream of water-containing gas from said feed stream source to each but only one of said chambers at any particular time; means to pass a portion of said stream of water-containing gas from said feed stream source to each but only one of said succeeding chambers when the desiccant in the preceding chamber is about one-half depleted; means to admix the dehydrated gas from each of said chambers; means to recover the resulting admixture of dehydrated gas as the product of the process; means to pass a hot drying gas to each of said chambers to regenerate the desiccant when the desiccant is depleted; means to remove the hot drying gas from each of said chambers; means to pass cooling gas to each of said chambers when the desiccant is regenerated; means to remove the cooling gas from each of said chambers; means to admix the hot drying gas and the cooling gas removed from each of said chambers; means to cool and condense a portion of water from the admixture of hot drying gas and cooling gas; means to remove the condensed water; and means to pass the resulting gas to the stream of water-containing gas passing to said chambers.

7. The method of dehydrating a water-containing gas in a plurality of desiccant-containing zones which operate cyclically and in parallel wherein at least one zone is being regenerated and at least two zones are dehydrating said gas which comprises dividing said gas into a first stream and a second stream; passing said first stream through a first and sole desiccant-containing zone; passing said second stream through a second and sole desiccant-containing zone when said first desiccant-containing zone is about one half through its dehydrating cycle; and combining said dried first and second streams.

References Cited by the Examiner

UNITED STATES PATENTS

| | | | |
|---|---|---|---|
| 2,919,764 | 1/1960 | Dillman et al. | 55—31 |
| 3,006,438 | 10/1961 | De Yarmett | 55—31 |
| 3,080,692 | 3/1963 | Staley et al. | 55—62 X |
| 3,093,465 | 6/1963 | Latta | 55—62 X |
| 3,186,144 | 6/1965 | Dow | 55—62 |

REUBEN FRIEDMAN, *Primary Examiner.*

C. N. HART, *Assistant Examiner.*